United States Patent [19]
Winzeler et al.

[11] Patent Number: 5,924,951
[45] Date of Patent: Jul. 20, 1999

[54] PLANETARY TRANSMISSION WITH DIRECT DRIVE THROUGH THE FRONT TRIPLE PLANETARY GEARSETS BY A SINGLE CLUTCH

[75] Inventors: James E. Winzeler, East Peoria; Rick A. Laylock, Washington; Timothy F. Nusz, Wyoming, all of Ill.

[73] Assignee: Caterpillar Inc., Peoria, Ill.

[21] Appl. No.: 08/989,215

[22] Filed: Dec. 11, 1997

[51] Int. Cl.[6] ............................ F16H 3/62; F16H 57/10
[52] U.S. Cl. ..................... 475/275; 475/286; 475/290
[58] Field of Search ................................ 475/269, 271, 475/275, 280, 286, 287, 290

[56] References Cited

U.S. PATENT DOCUMENTS

| | | | |
|---|---|---|---|
| 3,548,665 | 12/1970 | Crooks | 475/275 |
| 3,815,445 | 6/1974 | Gorrell et al. | 475/286 |
| 3,941,013 | 3/1976 | Miller | 475/287 |
| 4,046,031 | 9/1977 | Ott et al. | 475/287 |
| 4,172,393 | 10/1979 | Miller | 475/275 |
| 4,346,623 | 8/1982 | Tatsuo | 475/275 |
| 4,446,758 | 5/1984 | Winzeler et al. | 475/275 |
| 4,531,428 | 7/1985 | Windish | 475/285 |
| 5,230,761 | 7/1993 | Michioka et al. | 475/286 |
| 5,308,295 | 5/1994 | Michioka et al. | 475/275 |
| 5,358,458 | 10/1994 | Hicks | 475/269 |
| 5,370,589 | 12/1994 | Lepelletier | 475/286 |

*Primary Examiner*—Khoi Q. Ta
*Attorney, Agent, or Firm*—Calvin E. Glastetter

[57] ABSTRACT

A planetary transmission is disclosed including a front section having a first, a second, and a third planetary gear set each having a sun gear, a planet carrier and a ring gear. An input shaft is connected to at least two of the sun gears and the carrier of the third planetary gear set serves as the output. The front section of the transmission is operatively connected to a rear section for multi-speed use particularly adaptable to trucks or other machines.

10 Claims, 2 Drawing Sheets

| GEAR | CLUTCHES & BRAKES ENGAGED | | | | | | | TOTAL RED | STEP |
|---|---|---|---|---|---|---|---|---|---|
| | 36 | 40 | 42 | 38 | 44 | 46 | 48 | | |
| 1 | | | E | | | E | | 5.9731 | |
| | | | | | | | | | 1.3476 |
| 2 | | E | | | | E | | 4.4322 | |
| | | | | | | | | | 1.3440 |
| 3 | E | | | | | E | | 3.2979 | |
| | | | | | | | | | 1.3508 |
| 4 | | E | | | E | | | 2.4415 | |
| | | | | | | | | | 1.3440 |
| 5 | E | | | | E | | | 1.8167 | |
| | | | | | | | | | 1.3517 |
| 6 | | E | | E | | | | 1.3439 | |
| | | | | | | | | | 1.3440 |
| 7 | E | | | E | | | | 1.0000 | |
| | | | | | | | | | |
| R | | E | | | | | E | -5.2630 | |
| | | | | | | | | | |
| N | | E | | | | | | | |

Fig-3-
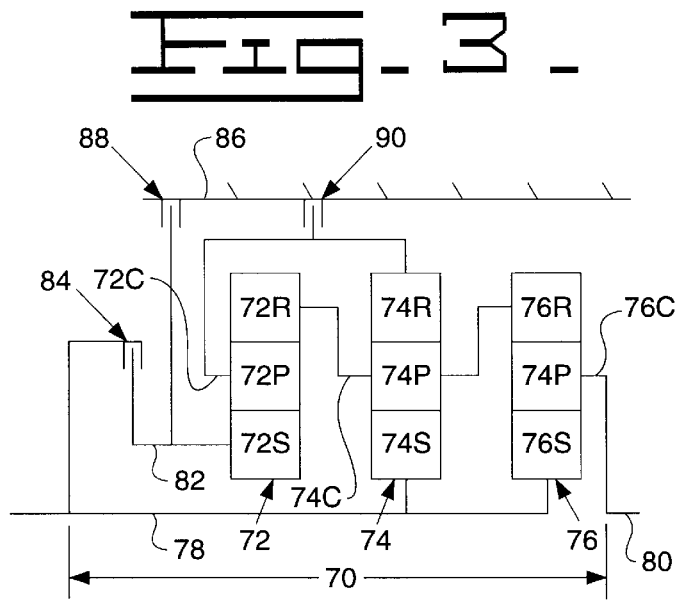
Fig-4-
| | CLUTCHES & BRAKES ENGAGED | | | | | | | TOTAL | |
|---|---|---|---|---|---|---|---|---|---|
| GEAR | 84 | 88 | 90 | 38 | 44 | 46 | 48 | RED | STEP |
| 1 | | | E | | | E | | 5.9730 | |
| | | | | | | | | | 1.3498 |
| 2 | | E | | | | E | | 4.4250 | |
| | | | | | | | | | 1.3418 |
| 3 | E | | | | | E | | 3.2979 | |
| | | | | | | | | | 1.3530 |
| 4 | | E | | | E | | | 2.4375 | |
| | | | | | | | | | 1.3418 |
| 5 | E | | | | E | | | 1.8166 | |
| | | | | | | | | | 1.3539 |
| 6 | | E | | E | | | | 1.3417 | |
| | | | | | | | | | 1.3418 |
| 7 | E | | | E | | | | 1.0000 | |
| | | | | | | | | | |
| R | | E | | | | | E | -5.0615 | |
| | | | | | | | | | |
| N | | E | | | | | | | |
| | | | | | | | | | | ns
PLANETARY TRANSMISSION WITH DIRECT DRIVE THROUGH THE FRONT TRIPLE PLANETARY GEARSETS BY A SINGLE CLUTCH

TECHNICAL FIELD

This invention relates generally to a planetary transmission, and more particularly to a multi-speed planetary transmission for a machine.

BACKGROUND ART

Planetary transmissions are known in the earthmoving and trucking machine industries which offer a large number of gear ratios by utilizing a plurality of serially interconnected planetary gear sets and a plurality of clutches and brakes for effecting the individual gear steps. Some of these transmissions have a two or a three speed front section followed by a multi-speed range unit for providing four or more forward speeds and at least one speed in reverse.

One of the disadvantages of those prior transmissions with dual front splitter units is that the rotating output member thereof to the rear range unit could have a relatively high mass and/or moment of inertia. This could be vexatious during the transient conditions of a gear shift in that such mass can cause a greater than desired variation in the energy absorption requirements between certain shifts.

Accordingly, what is desired is a three speed front section of a power shift transmission which has load sharing between the planetary gear sets for achieving minimum inertia one of the disadvantages of prior transmissions with an input transfer gear train ahead of the transmission is the additional gear train power losses, increased cost, and the increased gear train noise generated by the transfer gear train.

The present invention is directed to overcoming one or more of the problems as set forth above.

DISCLOSURE OF THE INVENTION

In one aspect of the present invention a planetary transmission includes a stationary housing. The planetary transmission also includes a front section having a shaft, a first planetary gear set, a second planetary gear set, and a third planetary gear set. Each of the planetary gear sets include a sun gear, a planet carrier and a ring gear. The shaft is connected to at least two of the sun gears of the planetary gear sets serving as the input and the planet carrier of the third planetary gear set serving as the output. The planetary transmission further includes a rotating clutch selectively connects the first planetary gear set to the shaft providing a direct drive mode of operation. A first brake selectively connects the first planetary gear set to the housing providing a first underdrive mode of operation. A second brake selectively connects the first and the second planetary gear sets to the housing providing a second underdrive mode of operation.

BRIEF DESCRIPTION OF THE DRAWINGS

FIG. 3 is a diagrammatic, side elevational view of a special second embodiment of the planetary transmission of the present invention which is comparable to the front section of the transmission illustrated in FIG. 1.

FIG. 4 is a chart showing the various clutches and brakes which must be engaged and speed ratio reduction for the second embodiment.

BEST MODE FOR CARRYING OUT THE INVENTION

Figure 1:
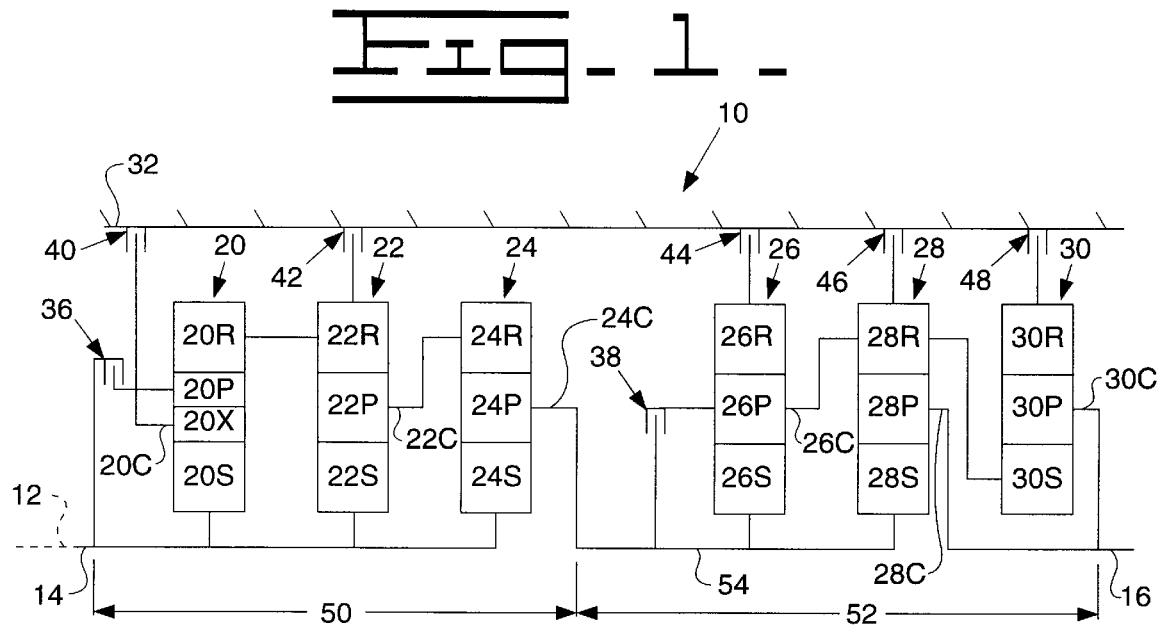
FIG. 1 is a diagrammatic, side elevational view o the planetary transmission of the present invention and illustrates the planetary elements on only one side of the rotational axis for simplicity.
Figure 2:
FIG. 2 is a chart listing the various clutches and brakes which must be engaged to obtain the seven forward and one reverse speeds of the transmission along with the total speed ratio reduction for each speed and the step ratios between each speed.

Referring initially to FIGS. 1 and 2, a machine planetary transmission 10 is schematically illustrated on one side of a rotational axis 12. The transmission includes an engine-driven input shaft 14 and an output shaft 16 connected to a conventional mechanism, not shown, for powerably rotating the ground-engaging members of the machine. The input shaft 14 and output shaft 16 are aligned along the rotational axis 12, which is commonly referred to as an inline configuration. In the embodiment illustrated, six interconnected planetary gear sets or epicyclic gear trains 20,22,24,26,28,30 are rotatably supported concentrically along the axis 12 within a surrounding and generally tubular transmission housing 32. Two rotating clutch assemblies or disc-type clutch assemblies 36,38 and five stationary clutches, or disc-type brake assemblies 40,42,44,46 and 48 are serially arranged along the length of the transmission for cooperating with and selectively coupling certain elements of the planetary gear sets and providing seven forward and at least one reverse speed as is generally indicated by the speed chart of FIG. 2. This particular transmission is, for example, particularly well suited for a large material carrying truck or earthmoving machine.

The planetary transmission 10 has a front section speed unit 50 of a particularly desirable construction, and a rear section or range unit 52 operatively associated therewith. The front section includes the first, second, third planetary gear sets 20,22,24, the first rotating clutch 36, the first and second brake assemblies 40,42. The front section basically provides a direct drive mode of operation and two underdrive modes of operation. The rear section includes the fourth, fifth and sixth planetary gear sets 26,28,30, the second rotating clutch 38 and the third, fourth and fifth brake assemblies 44,46,48. The rear section provides a plurality of forward speed reductions as well as at least one reverse speed reduction.

The construction and arrangement of the front section 50 is now explained in greater detail. The first planetary gear set 20, driven by the input shaft 14, includes a sun gear 20s, a carrier 20c and a ring gear 20r. The carrier 20c includes a plurality of intermediate planet gears 20x which intermesh with the sun gear 20s and a plurality of planet gears 20p. The plurality of planet gears 20p also mesh with the ring gear 20r. The carrier 20c is selectively connected to the input shaft 14, by engagement of the rotating clutch 36, to provide the direct drive mode of operation and is selectively connected to housing 32, by engagement of the brake 40, to provide the first underdrive mode of operation. The second planetary gear set 22 includes a sun gear 22s connected to the input shaft 14, a carrier 22c having planet gears 22p and a ring gear 22r. The ring gear 22r is connected for joint rotation with the ring gear 20r of the first planetary gear set 20 and is selectively connected to the housing 32, by engagement of the brake 42, to provide the second underdrive mode of operation. The second underdrive has more speed reduction than the first underdrive. The third planetary gear set 24 includes a sun gear 24s connected to the input shaft 14, a carrier 24c having planet gears 24p and a ring gear 24r. The ring gear 24r is connected for joint rotation with the carrier 22c of the second planetary gear set 22. The carrier 24c of the third planetary gear set 24 provides an output for the front section 50 and is connected to an intermediate shaft 54.

The sun gears 20s,22s,24s of the front section are all connected to the input shaft 14 to provide for load sharing. The sharing of the input torque between the planetary gear sets decreases the length and diameter required by the planetary gear sets. Consequently, the rotational moment of inertia of the planetary gear sets is also reduced.

The construction of the rear section 52 is now explained in greater detail. The intermediate shaft 54 provides the input to the rear section 52 since it is connected to and rotates with the carrier 24c of the front section 50. The intermediate shaft 54 is aligned with the input shaft 14 and the output shaft 16. The fourth planetary gear set 26 includes a sun gear 26s connected to the intermediate shaft 54, a carrier 26c having planet gears 26p and a ring gear 26r. The carrier 26c is selectively connected to the intermediate shaft 54 by engagement of the second rotating clutch 38. The ring gear 26r is selectively connected to the housing 32 by engagement of the third brake 44. The fifth planetary gear set 28 includes a sun gear 28s connected to the intermediate shaft 54, a carrier 28c having planet gears 28p and a ring gear 28r. The carrier 28c is connected for joint rotation with the output shaft 16. The ring gear 28r is connected for joint rotation with the carrier 26c of the fourth planetary gear set 26. The ring gear 28r is selectively connected to the housing 32 by engagement of the fourth brake 46. The sixth planetary gear set 30 includes a sun gear 30s, a carrier 30c having planet gears 30p and a ring gear 30r. The sun gear 30s is connected for joint rotation with the ring gear 28r of the fifth planetary gear set. The carrier 30c is connected for joint rotation with the output shaft 16. The ring gear 30r is selectively connected to the housing 32 by engagement of the fifth brake 48.

Referring again to FIG. 2 a chart 60 discloses which clutches and brakes need be engaged to achieve the desired gear ratio. The chart 60 also discloses the total reduction for each gear ratio and the step ratio between each gear. The letter E denotes which clutch or brake is engaged.

Referring now to FIG. 3 and 4, another embodiment of front section 70 is shown schematically. The front section 70 includes a first, a second and a third planetary gear set 72,74,76. The first planetary gear set 72 includes a sun gear 72s, a carrier 72c having planet gears 72p and a ring gear 72r. The second planetary gear set 74 includes a sun gear 74s, a carrier 74c having a planet gears 74p and a ring gear 74r. The third planetary gear set 76 includes a sun gear 76s, a carrier 76c having a planet gears 76p and a ring gear 76r. The front section 70 includes an engine-driven input shaft 78 and an output shaft 80. The input shaft 78 is connected for joint rotation with the sun gears 74s, 76s. The output shaft 80 is connected for joint rotation with the carrier 76c. A hollow input shaft 82 is connected for joint rotation to the sun gear 72s of the first planetary gear set 72. The hollow input shaft 82 is selectively connected with the input shaft 78, to provide a direct drive mode of operation, by engagement of a rotating clutch 84. The hollow input shaft 82 is selectively connected to a transmission housing 86, to provide the first underdrive mode of operation, by engagement of a first brake 88. The carrier 72c is connected for joint rotation with the ring gear 74r and is selectively connected to the housing 86 by engagement of a second brake 90 to provide the second underdrive mode of operation. The ring gear 72r is connected for joint rotation with the carrier 74c. The carrier 74c is connected for joint rotation with the ring gear 76r. The rear section 52 is also used with the front section 70 to provide the seven forward and one reverse speeds. The difference between FIG. 1 and FIG. 3 is in the first planetary gear sets 20 and 72. The second planetary gear sets 22 and 74 are identical. The third planetary gear sets 24 and 76 are identical. The connectivity between the second 22, 74 and the third 24, 76 planetary are identical in both embodiments.

Referring again to FIG. 4 a chart 92 discloses which clutches and brakes need to be engaged to achieve the desired gear ratio. The chart 92 also discloses the total reduction for each gear ratio and the step ratio between each gear.

INDUSTRIAL APPLICABILITY

The planetary transmission of FIGS. 1 and 2 is of a construction specifically adapted for use in the power train of a large off-highway earthmoving truck.

In the first forward gear the second brake 42 is engaged in the front section 50 to connect the ring gear 22r to the stationary housing 32 to provide the second underdrive mode of operation. That is, the speed reduction between the input shaft 14 and the output third planet carrier 24c is about 1.81. Simultaneously, the fourth brake 46 is engaged in the rear section 52 to hold the ring gear 28r fixed to the housing 32 and to afford a speed reduction with respect to the intermediate shaft 54. In the rear section 52, the fifth sun gear 28s serves as the input because it is directly coupled to the intermediate shaft 54, and the planet gears 28p are caused to rotate about the stationary fifth ring gear 28r and to drive the planet carrier 28c and the output shaft 16 at a total reduction of about 5.97 for the transmission as can be noted from reference to the chart of FIG. 2.

A shift to second gear from first gear is accomplished by disengaging the second brake 42 and engaging the first brake 40. This results in the first underdrive mode connecting the carrier 20c to the stationary housing 32. That is, the speed reduction between the input shaft 14 and the output third planet carrier 24c is about 1.34. It can be noted from FIG. 2 that the fourth brake 46 remains engaged and the total reduction is 4.43.

A shift from second to third gear is accomplished by disengaging the first brake 40 and engaging the first clutch 36. This results in the direct drive mode of operation. It can be noted from FIG. 2 that the fourth brake 46 remains engaged and the total reduction is 3.2979.

Shifting from third to fourth gear is achieved by returning to the first underdrive mode in the front section by disengaging the clutch 36 and reengaging the first brake 40. At the same time the fourth brake 46 is disengaged and the third brake 44 is engaged. In the rear section 52 the ring gear 26r is held stationary, and both the sun gears 26s,28s provide the input thereto via the intermediate shaft 54. Thus, the fourth and fifth planetary gear sets 26,28 cooperate through load sharing or split power flow paths to give a speed reduction between the intermediate shaft 54 and the planet carrier 28c and associated output shaft 16. It can be noted from FIG. 2 that the total reduction is 2.44.

Turning next to a shift from fourth to fifth gear, this is accomplished by merely shifting the front section 50 to the direct drive mode while continuing to hold the third brake 44 engaged and the total reduction is 1.81.

For sixth gear the front section is returned to the first underdrive condition, but the third brake 44 is disengaged and the second clutch 38 is engaged in the rear section 52. Such action in the rear section 52 directly couples the planet carrier 26p to the sun gear 26s, and hence the ring gear 26r, the sun gear 28s, and thus the planet carrier 28c and the entire sixth planetary gear set 30 for joint rotation as a unit or direct drive. It can be noted from FIG. 2 that the total reduction is 1.34.

Top or seventh gear operation retains the direct drive conditions of sixth gear in the rear section, and places the front section in direct drive also.

Reverse is achieved by engaging the first brake 40 for the first underdrive mode of operation in the front section, and in the rear section the fifth brake 48 is engaged for reverse. With the ring gear 30r held stationary the fifth and sixth planetary gear sets 28 and 30 cooperate to provide a negative speed reduction along multiple power paths wherein the planet carrier torques are subtracted from one another. In other words a portion of the torque flow is recirculated from the sun gear 30s of the sixth planetary gear set 30 back to the ring gear 28r of the fifth planetary gear set 28. It can be noted from FIG. 2 that the total reduction is −5.263.

In the alternate embodiment of the front section 70 the second brake 90 is engaged to connect the ring gear 74r and the carrier 72c to the stationary housing 86 to provide the second underdrive made of operation. The first brake 88 is engaged to connect the sun gear 72s to the stationary housing 86 to provide the first underdrive mode of operation. The rotating clutch 84 is engaged to connect the shaft 78 to the sun gear 72s to provide the direct drive mode of operation.

Neutral is achieved by the sole engagement of the first brake 40.

In view of the foregoing, it can be appreciated that the transmission of FIG. 1 and 3 has a particularly advantageous front section 50, 70 serving as the input and being normally engine driven, and with three planetary gear sets. The rotating clutch and two brakes are actuated to selectively couple various components for achieving the gear ratios. The load sharing of the planetary gear sets and the carrier output of the front section achieves minimum inertia in the components. The configuration provides a transmission which can be shifted from one range to the next range with a minimum of clutch and brake engagements and disengagements. The transmission provides improved efficiency, low noise, and lower cost.

Other aspects, objects and advantages of this invention can be obtained from a study of the drawings, the disclosure and the appended claims.

We claim:

1. A planetary transmission, comprising:

a stationary housing;

a front section having a shaft, a first planetary gear set, a second planetary gear set, a third planetary gear set, each of the planetary gear sets include a sun gear, a planet carrier with planet gears and a ring gear, the shaft being connected to at least two of the sun gears of the planetary sets serving as the input and the planet carrier of the third planetary set serving as the output;

a rotating clutch assembly selectively connects the first planetary gear set to the shaft and providing a direct drive mode of operation;

a first brake selectively connects the first planetary gear set to the housing and providing a first underdrive mode of operation; and a second brake selectively connects the first and second planetary gear sets to the housing and providing a second underdrive mode of operation.

2. The planetary transmission of claim 1, wherein the shaft is connected to the sun gears of the first, second and third planetary gear sets.

3. The planetary transmission of claim 1, wherein the shaft is connected to the sun gears of the second and third planetary gear sets.

4. The planetary transmission of claim 1, wherein the planet carrier of the first planetary gear set includes a plurality of intermediate planet gears intermeshing with the sun gear, a plurality of second planet gears intermeshing with the ring gear, and the intermediate planet gears mesh with the second planetary gears.

5. The planetary transmission of claim 1, wherein the rotating clutch selectively connects the planet carrier of the first planetary gear set to the shaft to provide the direct drive mode of operation.

6. The planetary transmission of claim 1, wherein the rotating clutch selectively connects the sun gear of the first planetary gear set to the shaft to provide the direct drive mode of operation.

7. The planetary transmission of claim 1, wherein the first brake selectively connects the planet carrier of the first planetary gear set to the housing to provide the first underdrive mode of operation.

8. The planetary transmission of claim 1, wherein the first brake selectively connects the sun gear of the first planetary gear set to the housing to provide the first underdrive mode of operation.

9. The planetary transmission of claim 1, wherein the second brake selectively connects the ring gear of the first and second planetary gear sets to the housing to provide the second underdrive mode of operation.

10. The planetary transmission of claim 1, wherein the second brake selectively connects the carrier of the first planetary set and the ring gear of the second planetary gear set to the housing to provide the second underdrive mode of operation.

* * * * *